Nov. 4, 1952     E. W. PARKER     2,616,172
SLITTER FOR CABLE COVERINGS
Filed Jan. 27, 1949
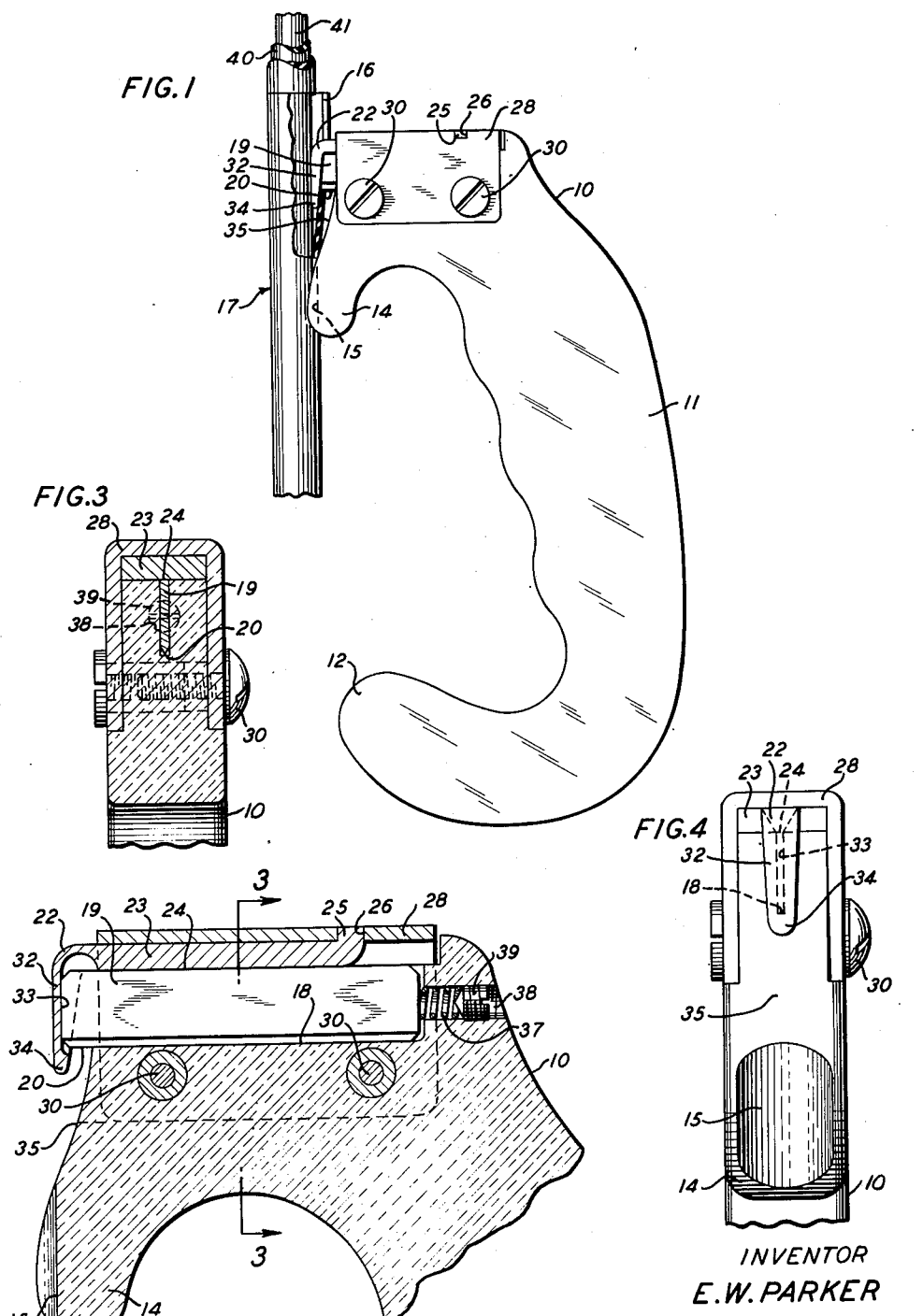
INVENTOR
E. W. PARKER
BY W. C. Parnell
ATTORNEY Patented Nov. 4, 1952

2,616,172

UNITED STATES PATENT OFFICE 2,616,172

SLITTER FOR CABLE COVERINGS

Earl W. Parker, Maplewood, N. J., assignor to Western Electric Company, Incorporated, New York, N. Y., a corporation of New York Application January 27, 1949, Serial No. 73,151

4 Claims. (Cl. 30—91)

1

This invention relates to tools for slitting coverings of cables and has for its object, a tool which is simple in structure and highly efficient in slitting coverings of cables and guarding against damage to the operator or the inner structures of the cables.

In the communication arts, new types of cable sheaths or coverings have presented new problems in that they are tougher and very difficult to cut by known methods and tools now available without damaging the inner structure of the cable.

In accordance with the aforementioned object, the invention comprises a tool having a handle slotted at one end to receive a cutting element one end of which extends beyond the handle and into a slot in a guide shoe to expose a cutting edge between the shoe and the handle. The cutting element, which may be a single edge razor blade of a known type, is held rigid over the major part of its length in the slot of the handle and is held against flexing at the cutting end by its engagement with the shoe under pressure applied by an adjustable spring in the handle.

In using the tool, the guide shoe is inserted between the covering and inner structure of the cable with an accurately recessed guide arm on the handle resting on the covering to keep the tool aligned while the cutting edge is pulled along the cable. During the cutting operation, the shoe lifts the covering from the cable core and spreads the cut portion so that it may be readily removed and the shoe and guide arm are so shaped and positioned as to form an effective guard for the cutting edge.

Other objects and advantages will be apparent from the following detailed description when considered in conjunction with the accompanying drawings, wherein Fig. 1 is a side elevational view of the slitting tool shown in position to strip a covering from a cable;

Fig. 2 is an enlarged vertical sectional view of a portion of the slitting tool;

Fig. 3 is a sectional view taken along the line 3—3 of Fig. 2; and

Fig. 4 is a bottom plan view of the structure shown in Fig. 2.

Referring now to the drawings, the slitting tool includes a handle 10 of the contour shown having a gripping portion 11 and a hook portion 12 to prevent the operator's hand from slipping off the handle during a stripping operation. A guide portion or member 14 of the handle 10 has an arcuate recess 15 in its under surface to ride on the sheath 16 of a cable indicated generally at 17.

The handle 10 is provided with a slot 18 to receive a cutting element 19, which in the present embodiment of the invention is a standard razor blade having a cutting edge 20. A guide shoe 22 has a vertical portion 23, to rest against the back edge 24 of the cutting element, and a hooked upper end 25. The hooked upper end 25 of the guide shoe 22 is disposed in a slot 26 of the central portion of a U-shaped holder 28 which straddles the adjacent end of the handle 10 and is secured to the handle by suitable bolts 30. A lateral portion 32 of the guide shoe 22 has a recess 33 therein for a snug fit with the adjacent end of the cutting element 19 to rigidly hold the cutting element against flexing during slitting operations. A leading end or nose 34 of the guide shoe 22 extends beyond the cutting edge 20 of the cutting element for a purpose hereinafter described. It will be noted that the under surface 35 of the handle 10 leading from the guide member 14 extends inwardly a given distance from the nose 34 of the guide shoe to provide suitable space for coverings of various thicknesses. A spring 37 housed in an aperture 38 of the handle 10 may apply varying forces to the cutting element 19 under the control of an adjusting screw 39 to urge the cutting element downwardly to hold its lower end within the recess 33 of the guide shoe 22.

To cut the covering 16 from a cable 17, without disturbing other coverings 40, or the electrical conductors 41 of the cable, the nose 34 of the guide shoe 22 is inserted beneath the covering and the guide member 14 is positioned to rest upon the covering. This may be done at the ends of the cable or at a cut portion intermediate its ends. The tool may then be moved, for example, downwardly (Fig. 1) to rapidly and efficiently slit the covering 16 for a desired length. During the slitting interval, the guide member 14 assures movement of the cutting element in a path parallel with the centerline of the cable, eliminating the possibility of the cutting element making an irregular cut or leaving the cable prior to the completion of the stripping operation. Furthermore, the guide member 14 may act as a fulcrum, whereby the guide shoe 22 may lift the covering 16 free of the conductors or the inner wrappings 40.

The guide shoe 22 in travelling longitudinally of the cable, first moves the sheath or covering away from the inner structure of the cable, before the sheath is cut by the cutting element. Furthermore, the guide shoe opens the cut sheath whereby it may be readily removed from the inner structure of the cable. With this slitting tool, no adjustment is necessary for cables of various sizes or with sheaths or coverings of various thicknesses. The combination of the guide member 14 and the cutting element 19 with the guide shoe 22, make the stripping tool self-aligning.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A slitter for cable coverings comprising a handle slotted at one end thereof, a cutting element disposed in the slot and having one end thereof extending beyond the handle, a guide shoe recessed to receive and hold the outer end of the cutting element against flexing during cutting of the covering from a cable, and a recessed guide member carried by the handle and spaced from the guide shoe to engage the covering on the cable in advance of the cutting element to control the position of the guide shoe in the cable during cutting of the covering thereof.

2. A slitter for cable coverings comprising a handle having a central gripping portion, a hooked leading end, a slotted following end and an integral recessed guide member to ride on the cable and guide it longitudinally of the cable, a cutting element disposed in the slotted end of the handle and having one end extending beyond the handle, and a guide shoe carried by the handle and having a portion, recessed to receive and firmly hold the outer end of the cutting element, extending beyond the cutting element to travel beneath the covering, hold the cutting element in cutting position, cooperate with the guide member to lift the covering from the inner portion of the cable and separate the cut ends of the covering as the cutting element cuts the covering.

3. A slitter for cable coverings comprising a handle having a central gripping portion, a hooked leading end, a slotted following end and an integral guide member recessed at its outer surface to partially conform to the cable and guide the handle longitudinally of the cable, a cutting element disposed in the slotted end of the handle and having one end extending beyond the handle, an L-shaped guide shoe carried by the handle adjacent the back and exposed end of the cutting element, a substantially U-shaped cover extending around the slotted following end of the handle and removably secured thereto to removably secure the cutting element and the L-shaped guide in place, the portion adjacent the exposed end of the cutter being recessed to receive and firmly hold the cutting element in cutting position, extend beyond the cutting element to travel beneath the covering, lift the covering from the inner portion of the cable and separate the cut portions of the covering as the cutting element cuts the covering.

4. A slitter for cable coverings comprising a longitudinally-extending handle having a hooked gripping portion at one end, a guide projecting portion on the handle and having an arcuate recess for engaging the outer surface of the cable, a guide shoe secured to the handle and spaced from the projecting guide portion and having an inclined surface spaced from the handle for engaging and lifting the inside of the covering of a cable, a cutting blade engaging the guide shoe for cutting the covering, and means for securing the guide shoe and the cutting blade to the handle.

EARL W. PARKER.

REFERENCES CITED

The following references are of record in the file of this patent:

UNITED STATES PATENTS

| Number | Name | Date |
|---|---|---|
| 1,135,361 | Cottle | Apr. 13, 1915 |
| 1,739,972 | Klinger | Dec. 17, 1929 |
| 1,801,889 | Ventimiglia | Apr. 21, 1931 |
| 2,259,662 | Roberts | Oct. 21, 1941 |
| 2,329,805 | Wilson | Sept. 21, 1943 |
| 2,356,165 | King | Aug. 22, 1944 |
| 2,398,979 | Vaughan Jr. | Apr. 23, 1946 |
| 2,476,288 | Dercole | July 19, 1949 |

FOREIGN PATENTS

| Number | Country | Date |
|---|---|---|
| 106,945 | Sweden | June 5, 1941 |